(12) United States Patent
Lee et al.

(10) Patent No.: US 8,448,618 B2
(45) Date of Patent: May 28, 2013

(54) VARIABLE VALVE LIFT APPARATUS THAT IS EQUIPPED WITH SWING ARM

(75) Inventors: Ju Hun Lee, Gwangmyung-si (KR); Jei Choon Yang, Yongin (KR); Gee Wook Shin, Hwaseong (KR); Jin Kook Kong, Suwon (KR); Soo Hyung Woo, Yongin (KR); Jin Soon Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 448 days.

(21) Appl. No.: 12/793,250

(22) Filed: Jun. 3, 2010

(65) Prior Publication Data

US 2010/0307436 A1 Dec. 9, 2010

(30) Foreign Application Priority Data

Jun. 4, 2009 (KR) .................. 10-2009-0049638

(51) Int. Cl.
*F01L 1/18* (2006.01)
(52) U.S. Cl.
USPC .................. 123/90.39; 123/90.44; 74/569

(58) Field of Classification Search
USPC .................. 123/90.39, 90.44, 90.16; 74/559, 74/567, 569
See application file for complete search history.

(56) References Cited

U.S. PATENT DOCUMENTS

| 6,837,197 B2* | 1/2005 | Cecur ......................... 123/90.16 |
| 7,328,675 B2* | 2/2008 | Seitz et al. .................. 123/90.39 |
| 7,926,455 B2* | 4/2011 | Manther et al. ............ 123/90.16 |

FOREIGN PATENT DOCUMENTS

| KR | 1020060003135 A | 1/2006 |
| KR | 1020090043283 A | 5/2009 |

* cited by examiner

*Primary Examiner* — Ching Chang
(74) *Attorney, Agent, or Firm* — Morgan, Lewis & Bockius LLP

(57) ABSTRACT

A variable valve lift device equipped with a swing arm variably lifting an exhaust valve or an intake valve may include an outer body in which a mounting groove is formed in the middle portion thereof, an inner body mounted inside the mounting groove of the outer body and with a rear end thereof pivotally-connected to the outer body in the outer body, and a latching portion formed in the outer body and the inner body and fixing or releasing a front end portion of the inner body to the outer body.

16 Claims, 5 Drawing Sheets

(A)

(B)

VARIABLE VALVE LIFT APPARATUS THAT IS EQUIPPED WITH SWING ARM

CROSS-REFERENCE TO RELATED APPLICATION

The present application claims priority to Korean Patent Application No. 10-2009-0049638 filed on Jun. 4, 2009, the entire contents of which is incorporated herein for all purposes by this reference.

BACKGROUND OF THE INVENTION

1. Field of the Invention

The present invention relates to a variable valve lift apparatus. More particularly, the present invention relates to a variable valve lift apparatus equipped with a swing arm that can variably adjust a lift amount of a valve depending on an operating condition of an engine.

2. Description of Related Art

An internal combustion engine generates power by burning fuel in a combustion chamber in an air media that is drawn into the chamber.

Intake valves are operated by a camshaft in order to intake the air, and the air is drawn into the combustion chamber while the intake valves are open. In addition, exhaust valves are operated by the camshaft, and a combustion gas is exhausted from the combustion chamber while the exhaust valves are open.

An optimal operation of the intake valves and the exhaust valves depends on a rotation speed of the engine. That is, an optimal lift or optimal opening/closing timing of the valves depends on the rotation speed of the engine.

For example, research has been undertaken for a variable valve lift (VVL) apparatus that enables different lifts depending on engine speed, and for a variable valve timing (VVT) apparatus that opens/closes the valves with different timing depending on the engine speed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a variable valve lift apparatus having advantages of varying a lift amount of a valve according to a driving condition of an engine.

The variable valve lift device is equipped with a swing arm variably lifting an exhaust valve or an intake valve, wherein the swing arm may include an outer body in which a mounting groove is formed in the middle portion thereof, an inner body mounted inside the mounting groove of the outer body and with a rear end thereof pivotally-connected to the outer body in the outer body, and a latching portion formed in the outer body and the inner body and fixing or releasing a front end portion of the inner body to the outer body.

The rear end of the inner body and the outer body may be pivotally connected with each other by a lost motion elastic member so that the inner body is elastically biased toward the outer body.

A front end surface of the inner body may be disposed to slide with an inner side surface of the mounting groove while the front end portion of the inner body is released from the outer body by the latching portion such that the inner body rotates based on the hinge.

The front end surface of the inner body and the inner side surface of the mounting groove of the outer body may be formed along a circle based on the center of a hinge coupling the rear end of the inner body and the outer body and has substantially the same curvature.

The latching portion may include an elastic member inserted into a spring groove formed in the front end portion of the inner body, a guide slidably disposed at a front end portion of the elastic member in the spring groove to be elastically moved by the elastic member toward the inner side surface of the mounting groove, a latching pin slidably inserted into a pin groove formed in the inner side surface of the mounting groove, wherein the pin groove is positioned to correspond to the spring groove when the inner body and the outer body is coupled, and a hydraulic pressure supply portion supplying hydraulic pressure to an inner side of the pin groove to insert a front end portion of the latching pin into the spring groove.

The variable valve lift device may further include a control portion that controls the hydraulic pressure supply portion according to a driving condition, wherein the front end portion of the latching pin pushes the guide to be inserted into the spring groove such that the inner body and the outer body are coupled to move together according to the hydraulic pressure, and wherein the latching pin is elastically drawn out from the spring groove by the elastic member such that the inner body is decoupled from the outer body to rotate based on a hinge coupling the rear end of the inner body and the outer body and when the hydraulic pressure is released.

The variable valve lift device may further include a roller disposed on the inner body and spaced with a predetermined distance from the rear end of the inner body to contact a cam, a hydraulic pressure gap adjustment device supporting one end portion of the outer body, and a valve supporting the other end portion of the outer body to open or close an air passage according to the movement of the outer body.

The hydraulic pressure may be supplied to the pin groove through an oil passage formed in the one end portion of the outer body and connected to the hydraulic pressure gap adjustment device.

In another aspect of the present invention, the variable valve lift apparatus, may include an outer body in which a mounting groove is formed in the middle portion thereof, an inner body that is mounted in the mounting groove of the outer body and a front end surface thereof slides with an inner side surface of the mounting groove of the outer body, wherein a rear end portion of the inner body is pivotally connected to the outer body by a hinge, and a latching portion formed in the outer body and the inner body and selectively coupling a front end portion of the inner body to the outer body, wherein the latching portion includes: an elastic member inserted into a spring groove formed in the front end portion of the inner body, a guide slidably disposed at a front end portion of the elastic member in the spring groove, and a latching pin slidably inserted into a pin groove formed in the inner side surface of the mounting groove, wherein the pin groove is positioned to correspond to the spring groove when the inner body and the outer body is coupled.

A stopper may be formed such that the guide does not protrude out of the front end surface of the inner body.

The stopper may include a protrusion formed on an interior circumference of the spring groove and prevents the guide from protruding out of the spring groove, wherein a groove is formed on an exterior circumference of the guide corresponding to the protrusion and the protrusion slides therein.

The stopper may include a protrusion formed on an interior circumference of the pin groove and prevents the guide from protruding out of the spring groove of the inner body, wherein a groove is formed on an exterior circumference of the latching pin corresponding to the protrusion and the protrusion slides therein.

The variable valve lift apparatus may include a lost motion elastic member that is disposed on the hinge to couple the inner body and the outer body and elastically bias the inner body toward the outer body based on the hinge.

The variable valve lift apparatus may further include a hydraulic pressure supply portion that supplies hydraulic pressure into the pin groove so as to push the latching pin forward.

The front end surface of the inner body and the inner side surface of the mounting groove may contact to slide with each other.

As stated above, in the variable valve lift apparatus equipped with a swing arm according to an exemplary embodiment of the present invention, a swing arm is divided into the inner body and the outer body, and the latching device connects or separates them such that the valve is variably controlled. Accordingly, the combustion cylinder can be efficiently deactivated according to a driving condition of an engine.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
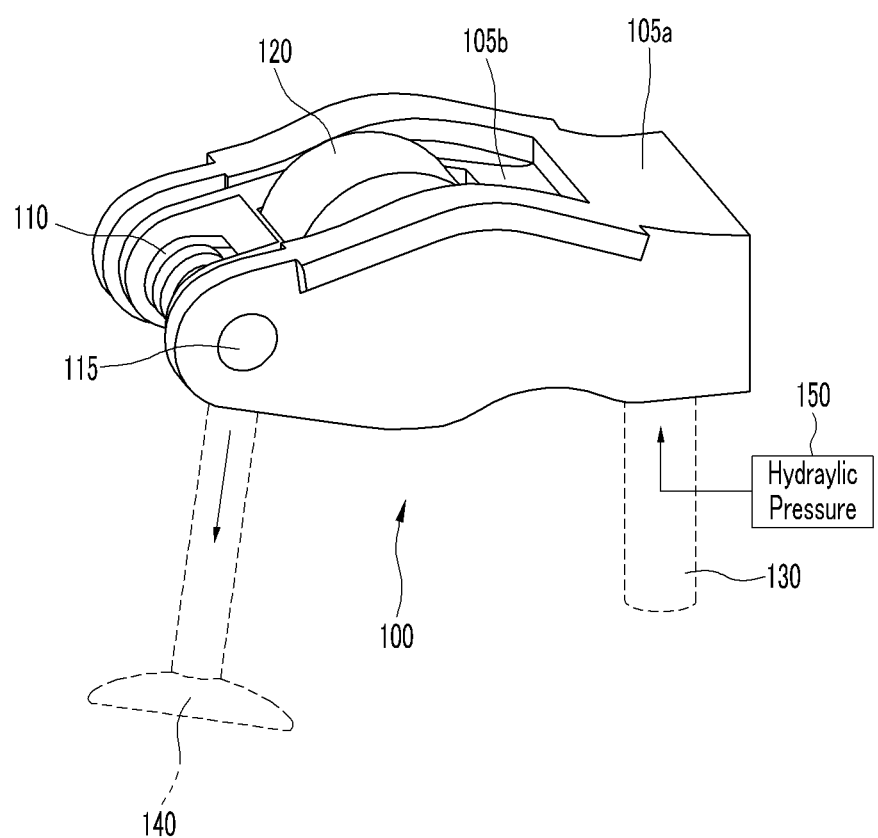
FIG. 1 is a partial perspective view of an exemplary variable valve lift apparatus equipped with a swing arm according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a partial perspective view of a variable valve lift apparatus equipped with a swing arm according to an exemplary embodiment of the present invention.

Referring to FIG. 1, a variable valve lift apparatus includes a swing arm 100, and the swing arm 100 includes an outer body 105a, an inner body 105b, a roller 120, a hinge 115, and a lost motion spring 110.

A right lower surface of the outer body 105a is supported by a hydraulic pressure gap adjustment device 130, a left lower surface thereof contacts an upper end of a valve 140, and the hydraulic pressure gap adjustment device 130 receives hydraulic pressure from a hydraulic pressure supply portion 150 to support one side of the outer body of the swing arm 100. The hydraulic pressure supply portion supplies the hydraulic pressure according to a control signal of a control portion (not shown).

Figure 2:
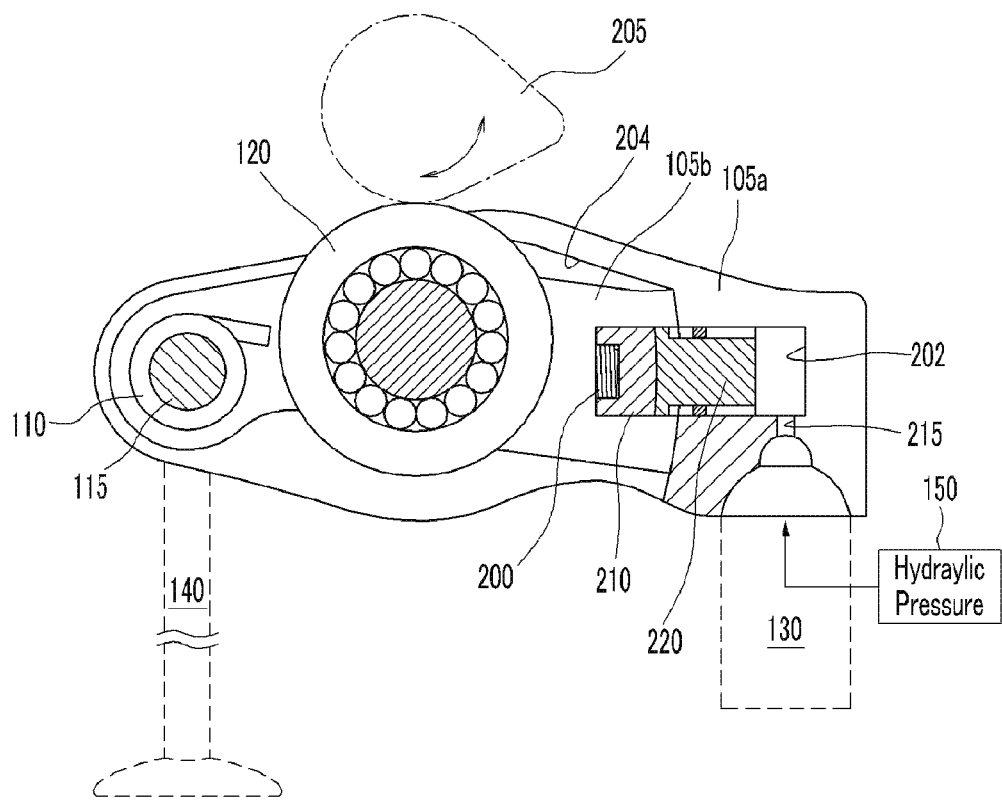
FIG. 2 is a partial cross-sectional view of an exemplary variable valve lift apparatus equipped with a swing arm in a condition in which hydraulic pressure is supplied according to the present invention.

The inner body 105b is mounted in an inner side mounting groove 204 of the outer body 105a of FIG. 2, a front end portion of the inner body 105b faces the hydraulic pressure gap adjustment device 130, and a rear end portion thereof faces the valve 140.

The rear end portion of the inner body 105b is connected to the outer body 105a by the hinge 115, and the lost motion spring 110 is disposed on the hinge 115 to elastically rotate the inner body 105b in a counterclockwise direction based on the hinge 115.

The roller 120 is disposed in the middle portion of the inner body 105b to protrude in an upper direction, and if the roller 120 is pushed in a lower direction by a cam 205 of FIG. 2, the swing arm 100 moves the valve 140 down.

A latching structure is used to move or not to move the valve 140 in an exemplary embodiment of the present invention, and detail structures will be explained referring to FIG. 2 and FIG. 3.

Figure 3:
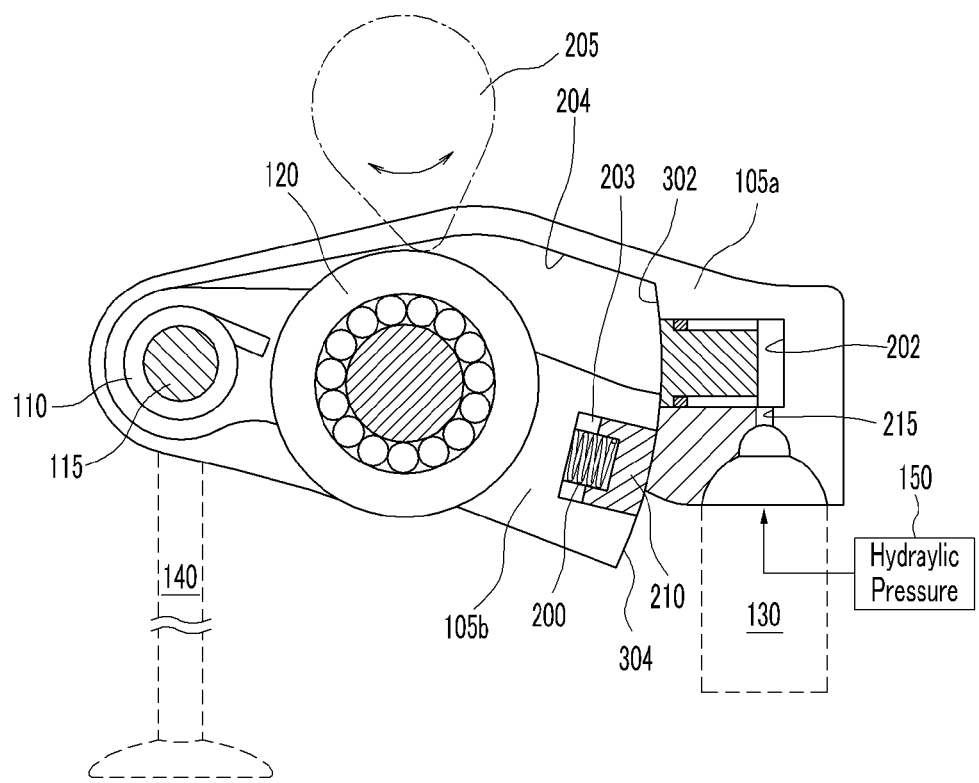
FIG. 3 is a partial cross-sectional view of an exemplary variable valve lift apparatus equipped with a swing arm in a condition in which hydraulic pressure is not supplied according to the present invention.

FIG. 2 is a partial cross-sectional view of a variable valve lift apparatus equipped with a swing arm in a condition in which hydraulic pressure is supplied according to an exemplary embodiment of the present invention, and FIG. 3 is a partial cross-sectional view of a variable valve lift apparatus equipped with a swing arm in a condition in which hydraulic pressure is not supplied according to an exemplary embodiment of the present invention.

Referring to FIG. 2 and FIG. 3, the mounting groove 204 that is opened from an upper surface to a lower surface is formed in the middle of the outer body 105a, and the inner body 105b is disposed right and left in the mounting groove 204.

A left end portion, that is, a rear end portion of the inner body 105b, is fixed to the outer body 105a by the hinge 115, and a right front end surface 304 slides with an inner side surface 302 of the mounting groove 204. Also, the roller 120 is rotatably disposed on the middle portion of the inner body 105b, the cam 205 is disposed at an upper side of the roller 120, and the cam 205 contacts the roller 120.

In the outer body 105a, a cylindrical pin groove 202 is formed on the inner side surface that slides with the front end surface 304 of the inner body 105b, and a latching pin 220 is inserted into the pin groove 202. The pin groove 202 is opened to a side of the front end surface 304 of the inner body 105b, and is connected to the hydraulic pressure gap adjustment device 130 and the hydraulic pressure supply portion 150 through an oil passage 215.

In the inner body 105b, a spring groove 203 is formed corresponding to the pin groove 202 on the front end surface 304 that slides with the inner side surface 302 of the outer body 105a, a return spring 200 is inserted into the spring groove 203, and a guide 210 is disposed at an end portion of the return spring 200. Further, the spring groove 203 is opened to a side of the inner side surface 302 of the outer body 105a.

In an exemplary embodiment of the present invention, the front end surface 304 of the outer body 105a and the inner side surface 302 of the inner body 105b are formed along a circle based on the center of the hinge 115.

A function of a latching pin connecting or separating the inner body 105b and the outer body 105a is explained as follows. If the hydraulic pressure is supplied into the pin groove 202 through the hydraulic pressure gap adjustment device 130, the front end portion of the latching pin 220 is inserted into the spring groove 203.

Accordingly, the latching pin 220 is disposed along the spring groove 203 and the pin groove 202, and if the cam 205 pushes the roller 120 downwards, the inner body 105b and the outer body 105a rotate based on the hydraulic pressure gap adjustment device 130 to push the valve 140 downwards.

Further, if the hydraulic pressure is not supplied to the pin groove 202 through the hydraulic pressure gap adjustment device 130, the guide 210 pushes the latching pin 220 by the return spring 200 such that the latching pin 220 is inserted into the pin groove 202 and the inner body 105b and the outer body 105a are separated, and if the cam 205 pushes the roller 120 downwards, the inner body 105b rotates in a clockwise based on the hinge 115 such that the outer body 105a does not move. Accordingly, the valve 140 does not move, and an intake stroke, a compression stroke, an explosion stroke, or an exhaust stroke is deactivated.

It is desirable that the front end surface 304 of the inner body 105b and the inner side surface 302 of the outer body 105a contact to slide with regard to each other in an exemplary embodiment of the present invention, and the front end surface 304 and the inner side surface 302 are formed in a fan shape along a circle based on a center of the hinge 115.

Further, in a case that the hydraulic pressure is not be supplied into the pin groove 202, a stopper is formed in the outer body or the inner body such that the guide 210 does not protrude outside the front end surface 304. The stopper can be a protrusion that is formed on an interior circumference of the spring groove 203 or on an interior circumference of the pin groove 202.

Figure 4:
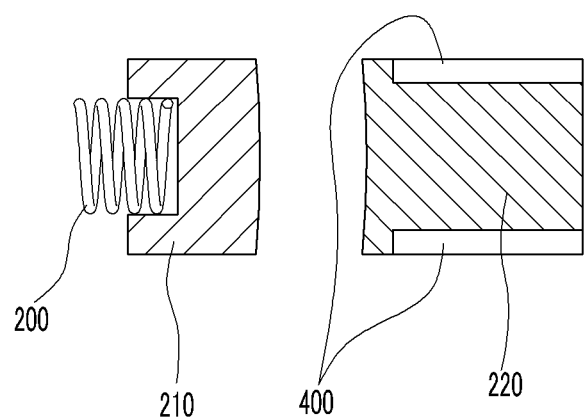
FIG. 4 is a partial exploded side view of an exemplary variable valve lift apparatus equipped with a swing arm according to the present invention.
Figure 5:
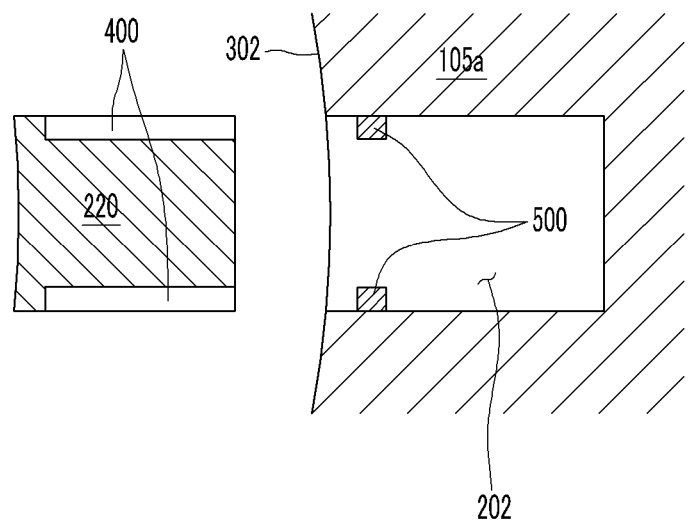
FIG. 5(A) and FIG. 5(B) are a partial detail side view of an exemplary variable valve lift apparatus equipped with a swing arm according to the present invention.
Figure 5:
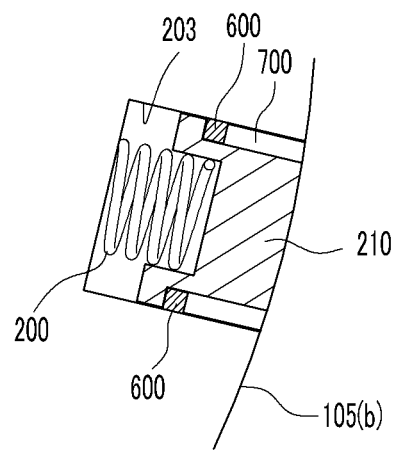

FIG. 4 is a partial exploded side view of a variable valve lift apparatus equipped with a swing arm according to an exemplary embodiment of the present invention, and FIG. 5(A) and FIG. 5(B) are a partial detail side view of a variable valve lift apparatus equipped with a swing arm according to an exemplary embodiment of the present invention.

Referring to FIG. 4, the return spring 200 is a coil spring type, and the guide 210 is a circular cup type to cover the front end of the return spring 200. Further, the latching pin 220 is a cylindrical type, a front surface of the guide 210 is formed in a fan shape along the front end surface 304 of the inner body 105b, and a front surface of the latching pin 220 is formed in a fan shape along the inner side surface 302.

Referring to FIG. 4 and FIG. 5(A), a protrusion 500 is formed on an interior circumference of the pin groove 202 of the outer body 105a, and the protrusion 500 is disposed in a movement direction of the inner body 105b. Further, a groove 400 is formed on an exterior circumference of the latching pin 220 corresponding to the protrusion 500, and the groove 400 guides the movement of the latching pin 220 in a length direction thereof.

Referring to FIG. 5(A), the protrusion 500 is disposed in a position that is inserted from the inlet of the pin groove 202 with a predetermined length, and the groove 400 is formed at an exterior circumference of the latching pin 220 in a length direction and is not formed at a front portion of the latching pin 220 such that the front surface of the latching pin is not inserted into the pin groove 202.

Referring to FIG. 5(B), the protrusion 600 may be disposed in a position that is inserted from the inlet of the spring groove 203 with a predetermined length, and the groove 700 is formed at an exterior circumference of the guide 210 in a length direction and is not formed at a rear portion of the guide 210 such that the front surface of the guide 210 does not protrude out of the spring groove 203.

Accordingly, if the hydraulic pressure is not supplied, the latching pin 220 is not inserted into the spring groove 203 such that the guide 210 pushes the latching pin 220 by the elastic force of the return spring 200, and the front end surface 304 of the inner body 105b smoothly slides with the inner side surface 302 of the outer body 105a without locking.

For convenience in explanation and accurate definition in the appended claims, the terms "upper", "lower", "front", "rear", "interior", "exterior", "outer", and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable valve lift device equipped with a swing arm variably lifting an exhaust valve or an intake valve, wherein the swing arm comprises:
    an outer body in which a mounting groove is formed in the middle portion thereof;
    an inner body mounted inside the mounting groove of the outer body and with a rear end thereof pivotally-connected to the outer body in the outer body; and
    a latching portion formed in the outer body and the inner body and fixing or releasing a front end portion of the inner body to the outer body,
    wherein the latching portion includes:
        an elastic member inserted into a spring groove formed in the front end portion of the inner body;
        a guide slidably disposed at a front end portion of the elastic member in the spring groove to be elastically moved by the elastic member toward an inner side surface of the mounting groove;

a latching pin slidably inserted into a pin groove formed in the inner side surface of the mounting groove, wherein the pin groove is positioned to correspond to the spring groove when the inner body and the outer body are coupled; and a hydraulic pressure supply portion supplying hydraulic pressure to an inner side of the pin groove to insert a front end portion of the latching pin into the spring groove.

2. The variable valve lift device of claim 1, wherein the rear end of the inner body and the outer body are pivotally connected with each other by a lost motion elastic member so that the inner body is elastically biased toward the outer body.

3. The variable valve lift device of claim 1, wherein a front end surface of the inner body is disposed to slide with an inner side surface of the mounting groove while the front end portion of the inner body is released from the outer body by the latching portion such that the inner body rotates based on a hinge.

4. The variable valve lift device of claim 3, wherein the front end surface of the inner body and the inner side surface of the mounting groove of the outer body are formed along a circle based on the center of a hinge coupling the rear end of the inner body and the outer body and has substantially the same curvature.

5. The variable valve lift device of claim 1, further comprising a control portion that controls the hydraulic pressure supply portion according to a driving condition, wherein the front end portion of the latching pin pushes the guide to be inserted into the spring groove such that the inner body and the outer body are coupled to move together according to the hydraulic pressure, and wherein the latching pin is elastically drawn out from the spring groove by the elastic member such that the inner body is decoupled from the outer body to rotate based on a hinge coupling the rear end of the inner body and the outer body and when the hydraulic pressure is released.

6. The variable valve lift device of claim 1, further comprising:

a roller disposed on the inner body and spaced with a predetermined distance from the rear end of the inner body to contact a cam;

a hydraulic pressure gap adjustment device supporting one end portion of the outer body; and a valve supporting the other end portion of the outer body to open or close an air passage according to the movement of the outer body.

7. The variable valve lift device of claim 6, wherein the hydraulic pressure is supplied to the pin groove through an oil passage formed in the one end portion of the outer body and connected to the hydraulic pressure gap adjustment device.

8. A variable valve lift apparatus, comprising:

an outer body in which a mounting groove is formed in the middle portion thereof;

an inner body that is mounted in the mounting groove of the outer body and a front end surface thereof slides with an inner side surface of the mounting groove of the outer body, wherein a rear end portion of the inner body is pivotally connected to the outer body by a hinge; and a latching portion formed in the outer body and the inner body and selectively coupling a front end portion of the inner body to the outer body, wherein the latching portion includes:

an elastic member inserted into a spring groove formed in the front end portion of the inner body;

a guide slidably disposed at a front end portion of the elastic member in the spring groove; and a latching pin slidably inserted into a pin groove formed in the inner side surface of the mounting groove, wherein the pin groove is positioned to correspond to the spring groove when the inner body and the outer body is coupled.

9. The variable valve lift apparatus of claim 8, wherein a stopper is formed such that the guide does not protrude out of the front end surface of the inner body.

10. The variable valve lift apparatus of claim 9, wherein the stopper includes a protrusion formed on an interior circumference of the spring groove and prevents the guide from protruding out of the spring groove.

11. The variable valve lift apparatus of claim 10, wherein a groove is formed on an exterior circumference of the guide corresponding to the protrusion and the protrusion slides therein.

12. The variable valve lift apparatus of claim 9, wherein the stopper includes a protrusion formed on an interior circumference of the pin groove and prevents the guide from protruding out of the spring groove of the inner body.

13. The variable valve lift apparatus of claim 12, wherein a groove is formed on an exterior circumference of the latching pin corresponding to the protrusion and the protrusion slides therein.

14. The variable valve lift apparatus of claim 8, further comprising a lost motion elastic member that is disposed on the hinge to couple the inner body and the outer body and elastically bias the inner body toward the outer body based on the hinge.

15. The variable valve lift apparatus of claim 8, further comprising a hydraulic pressure supply portion that supplies hydraulic pressure into the pin groove so as to push the latching pin forward.

16. The variable valve lift apparatus of claim 8, wherein the front end surface of the inner body and the inner side surface of the mounting groove contact to slide with each other.

* * * * *